United States Patent
Komiya

Patent Number: 5,977,398
Date of Patent: Nov. 2, 1999

[54] VISCOSITY CONDITIONER

[75] Inventor: Kaoru Komiya, Tokyo, Japan

[73] Assignee: Asahi Denka Kogyo K.K., Japan

[*] Notice: This patent is subject to a terminal disclaimer.

[21] Appl. No.: 08/701,768

[22] Filed: Aug. 26, 1996

[30] Foreign Application Priority Data

Sep. 1, 1995 [JP] Japan ................... 7-225363

[51] Int. Cl.⁶ .............. C07C 271/08; C07C 217/10; C07C 271/26; C08K 5/205
[52] U.S. Cl. ............ 560/25; 252/312; 252/315.1; 524/198; 524/728; 528/49; 528/76; 560/26; 560/32; 560/115; 560/158; 560/163; 560/164
[58] Field of Search .......... 528/49, 76; 524/198, 524/728; 560/25, 26, 115, 158, 32, 163, 164

[56] References Cited

U.S. PATENT DOCUMENTS

| | | | |
|---|---|---|---|
| 4,079,028 | 3/1978 | Emmons et al. | 524/507 |
| 4,155,892 | 5/1979 | Emmons et al. | 524/507 |
| 4,678,705 | 7/1987 | Huisman et al. | 428/315.9 |
| 5,281,654 | 1/1994 | Eisenhart et al. | 524/500 |
| 5,387,367 | 2/1995 | Haeberle et al. | 252/182.22 |
| 5,684,072 | 11/1997 | Rardon et al. | 524/199 |
| 5,753,731 | 5/1998 | Yoshioka et al. | 524/198 |
| 5,808,131 | 9/1998 | Gruenbauer et al. | 560/25 |

FOREIGN PATENT DOCUMENTS

| | | |
|---|---|---|
| 32 174/78 | 12/1979 | Australia . |
| 52-25840 | 7/1977 | Japan . |
| 58-213074 | 12/1983 | Japan . |
| 1-55292 | 11/1989 | Japan . |

*Primary Examiner*—Rabon Sergent
*Attorney, Agent, or Firm*—Wenderoth, Lind & Ponack, L.L.P.

[57] ABSTRACT

A viscosity conditioner is disclosed which is comprised of a compound represented by the following formula

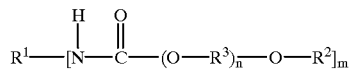

(1)

where $R^1$ to $R^3$ each are hydrocarbyl groups which may be identical or different, m ranges from 2 to 4, and n ranges from 1 to 1,000. The specified viscosity conditioner is by nature non-ionic and excellent in leveling.

6 Claims, No Drawings

VISCOSITY CONDITIONER

BACKGROUND OF THE INVENTION

1. Field of the Invention

This invention relates to novel viscosity conditioners and also to compositions utilizing such a viscosity conditioner.

2. Description of the Related Art

A wide variety of viscosity builders are commonly known which are natural, semi-synthetic (carboxymethyl cellulose and the like) or synthetic in character. Also, there are many known reaction products obtained by reaction of polyoxyethylene glycol derivatives with aliphatic acid esters or epoxides.

Furthermore, so-called urethane-type viscosity builders which are derived by reacting an isocyanate compound with a polyol compound are well known. For instance, Japanese Patent Publication No. 52-25840 discloses a highly viscous emulsion type surfactant resulting from reaction of a polyether polyol and a diisocyanate. Japanese Patent Laid-Open No. 58-213074 discloses a urethane type aqueous viscosity builder prepared by reacting a polyether polyol and a diisocyanate. In Japanese Patent Publication No. 1-55292, a latex is disclosed which contains an aqueous viscosity builder induced from reaction of a polyether polyol and a polyisocyanate.

However, viscosity builders for use in emulsion paints in particular should in most cases exert, in addition to adequate viscosity buildup, sufficient fluidity and uniform spreadability and excellent viscosity modification performance of under both low and high shear conditions.

SUMMARY OF THE INVENTION

The present invention, therefore, seeks to provide a non-ionic viscosity conditioner that has excellent leveling properties.

Through their intensive research, the present inventors have found that viscosity conditioners comprised of a certain specific compound of the following structural formula can attain those performance characteristics which are not feasible with conventional viscosity builders, leading to the present invention.

That is, the viscosity conditioner of the present invention is characterized by Formula (1) in which:

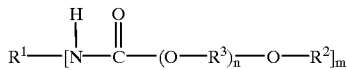

(1)

where $R^1$ to $R^3$ each are hydrocarbyl groups which may be identical or different $R^2$ has 8 to 36 carton atoms, m is 2, and n ranges from 1 to 1,000.

DETAILED DESCRIPTION OF THE INVENTION

The compound of Formula (1) according to the present invention can be preferably prepared for example by reacting one or more diisocyanate compounds, the formula. $R^1$—$(NCO)_m$ and one or more polyether monool compound of the formula $R^2$—O—$(R^3$—O$)_n$—H obtained by reaction of one or more monovalent hydroxyl compound with an alkylene oxide, a styrene oxide or the like. In such instance, $R^1$, $R^2$ and $R^3$ of Formula (1) are determined depending upon the $R^1$—$(NCO)_m$ and $R^2$—O—$(R^3$—O$)_n$—H to be employed.

Diisocyanate of an m valence and of $R^1$—$(NCO)_m$ for use in Formula (1) are not particularly restricted so long as they contain in their respective molecules 2 to 4 isocyanate groups. Eligible diisocyanates may be chosen for example from aliphatic diisocyanates, aromatic diisocyanates, alicyclic diisocyanates, biphenyl diisocyanates, phenylmethane diisocyanates and the like.

Aliphatic diisocyanates useful for the present invention include for example methylene diisocyanate, dimethylene diisocyanate, trimethylene diisocyanate, tetramethylene diisocyanate, pentamethylene diisocyanate, hexamethylene diisocyanate, dipropylether diisocyanate, 2,2-dimethylpentane diisocyanate, 3-methoxyhexane diisocyanate, octamethylene diisocyanate, 2,2,4-trimethylpentane diisocyanate, nonamethylene diisocyanate, decamethylene diisocyanate, 3-butoxyhexane diisocyanate, 1,4-butyleneglycol dipropylether diisocyanate, thiodihexyl diisocyanate, metaxylylene diisocyanate, paraxylylene diisocyanate, tetramethylxylylene diisocyanate and the like.

Suitable aromatic diisocyanates include for example metaphenylene diisocyanate, paraphenylene diisocyanate, 2,4-tolylene diisocyanate, 2,6-tolylene diisocyanate, dimethylbenzene diisocyanate, ethylbenzene diisocyanate, isopropylbenzene diisocyanate, tolidine diisocyanate, 1,4-naphthalene diisocyanate, 1,5-naphthalene diisocyanate, 2,6-naphthalene diisocyanate, 2,7-naphthalene diisocyanate and the like.

Alicyclic diisocyanates used herein may be selected for example from hydrogenated xylylene diisocyanate, isophorone diisocyanate and the like.

Suitable biphenyl diisocyanates are exemplified for example by biphenyl diisocyanate, 3,3'-dimethylbiphenyl diisocyanate, 3,3'-dimethoxybiphenyl diisocyanate and the like.

Phenylmethane diisocyanates used herein include for example diphenylmethane-4,4'-diisocyanate, 2,2'-dimethyldiphenylmethane-4,4'-diisocyanate, diphenyldimethylmethane-4,4'-diisocyanate, 2,5,2',5'-tetramethyl-diphenylmethane-4,4'-diisocyanate, cyclohexyl bis(4-isocyanate phenyl)methane, 3,3'-dimethoxydiphenylmethane-4,4'-diisocyanate, 4,4'-dimethoxydiphenylmethane-3,3'-diisocyanate, 4,4'-diethoxydiphenylmethane-3,3'-diisocyanate, 2,2'-dimethyl-5,5-dimethoxydiphenylmethane-4,4'-diisocyanate, 3,3'-dichlorodiphenyldimethylmethane-4,4'-diisocyanate, benzophenone-3,3'-diisocyanate and the like.

The diisocyanate compounds listed above may be used in the form of a dimer or a trimer (isocyanurate linkage), or as a biuret derived upon reaction with an amine.

No particular restriction is imposed upon the kind of polyether monools of $R^2$—O—$(R^3$—O$)_n$—H insofar as they are polyethers induced from hydroxyl compounds. Such a polyether monool is derivable from addition-polymerizing a monovalent hydroxyl compound of $R^2$—OH with an alkylene oxide such as ethylene oxide, propylene oxide, butylene oxide, epichlorohydrin or the like, a styrene oxide or the like.

The monovalent hydroxyl compounds of $R^2$—OH are not especially limited if they are prepared from a hydrocarbon of a straight, branched, saturated, unsaturated, aliphatic, alicyclic or aromatic type with one of its hydrogen atoms substituted with a hydroxyl group. Monohydric alcohols and monohydric phenols above all can be suitably employed and are chosen for example from monovalent alcohols such as octanol, 2-ethylhexanol, nonanol, decanol, lauryl alcohol, tridecanol, isotridecyl alcohol, myristyl alcohol, cetyl alcohol, palmityl alcohol, stearyl alcohol, eicosanol, docosanol, tetracosaconol, hexacosanol, octacosanol, myricyl alcohol, racenol, tetratriacontanol, allyl alcohol, oleyl alcohol, isostearyl alcohol, and the like, and from monovalent phenols having 8 to 36 carbon atoms such as ethylphenol, tertiary butylphenol, octylphenol, nonylphenol, dodecylphenol, styrenated phenol, paracumylphenol and the like. Among the compounds listed here, those of 8 to 36 carbon atoms are most preferred.

The substituent group $R^2$ is a hydrocarbyl group having 8 to 36 carbon atoms and can be, for example, a member selected from the group consisting of an alkyl group, an alkenyl group, an alkylaryl group and an aralkyl aryl group.

The substituent group $R^3$ is determined by the kind of alkylene oxides, styrene oxides or the like to be bonded. Alkylene oxides of 2 to 4 in carbon number are particularly preferable as they are easily available and highly capable of rendering the resultant viscosity conditioner conducive to enhanced effect of viscosity modification.

Bonding or addition of the alkylene oxide, styrene oxide or the like may be conducted in a known manner by homopolymerization, or random or block polymerization of two or more such oxides. The polymerization degree n is in the range of 1 to 1,000, preferably of 5 to 800, more preferably of 10 to 200. The proportion of ethylene chain in the group $R^3$ is preferably in the range of 50 to 100% by weight, more preferably of 65 to 100% by weight, based on the total weight of the group $R^3$ so that good viscosity modification is attainable.

The diisocyanate compounds of $R^1$—$(NCO)_m$ and the polyether monool compounds of $R^2$—O—$(R^3$—O$)_n$—H can be prepared ordinarily by reaction of a polyether and an isocyanate, for example, at 80 to 90° C. for 1 to 3 hours.

The viscosity conditioner according to the present invention offers those physical properties which the foregoing viscosity builders of the prior art have failed to achieve. For instance, this viscosity conditioner is by nature non-ionic, and despite its relatively low molecular weight, it can provide good viscosity increase effect even upon addition in a smaller amount to an aqueous system. The viscosity conditioner of the invention is stable in water and alcohol. Also advantageously, when used for emulsion paints in particular, such viscosity conditioner has a role in imparting give adequate viscosity increases to such paints and further contributes in most instances to outstanding performance of viscosity modification under both low- and high-shear conditions. It is also excellent in respect to leveling.

The viscosity conditioner of the present invention is applicable to aqueous systems such as emulsions, latexes and dispersible fluids (suspensions and dispersions).

Suitable polymeric emulsions of a vinyl acetate type include for example homopolymer emulsions of a vinyl acetate monomer, copolymer emulsions of a vinyl acetate monomer with a comonomer such as ethylene, vinyl chloride, acrylic acid, acrylate ester, methacrylic acid, methacrylate ester, beova, maleic acid or maleate ester and the like. Suitable polymeric emulsions of an acrylic type include for example homopolymer emulsions of a monomer such as acrylic acid, acrylate ester, methacrylic acid, methacrylate ester or acrylonitrile, copolymer emulsions of two or more of these monomers, copolymer emulsions of one or more of these monomers with a styrene comonomer and the like. Suitable polymeric emulsions of a vinylidene type include for example homopolymer emulsions of a vinylidene chloride monomer, copolymer emulsions of a vinylidene chloride monomer with a comonomer such as acrylic acid, acrylate ester, methacrylic acid, methacrylate ester, acrylonitrile or vinyl chloride and the like. Included in other suitable polymeric emulsions are urethane resin emulsions, silicone resin emulsions, epoxy resin emulsions and fluorine resin emulsions. Eligible latexes are exemplified for example by SBR latex, SB latex, ABS latex, NBR latex, CR latex, VP latex, BR latex, MBR latex, IR latex and the like.

Upon dissolution or dispersion in water, the viscosity conditioner of the present invention brings about its effects of viscosity modification and usually may be used in an amount of 0.01 to 10%, preferably of 0.01 to 5%, based on the solid content of a given polymeric emulsion or on the weight of a given latex. Into the polymeric emulsion or latex, the viscosity conditioner can be incorporated as it is, or after it is diluted to a suitable viscosity by the use of water or solvent. In the case where it is applied to emulsion paints, the viscosity conditioner of the invention may be added as an aqueous solution of ethanol at a kneading or preparation stage of such an emulsion paint with the result that convenient workability is ensured with the viscosity conditioner added in an amount of 0.01 to 5%.

The above polymeric emulsions can be prepared with use of one or more anionic, cationic or nonionic emulsifier. Two or more emulsifiers may be admixed with one another irrespective of their types.

The amount of the emulsifier to be used is in the range of 0.1 to 6% by weight based on the weight of a selected monomer and may be greater than 6% by weight where desired in some cases. Frequently, when an initiator such as a persulfate salt is added, no emulsifier may frequently be needed. The average molecular weights of the emulsion polymers thus produced are generally in the range of about $1 \times 10^5$ to $1 \times 10^7$ and mostly beyond $5 \times 10^5$.

Due to its nonionic nature, the viscosity conditioner of the present invention is also effective for alkaline polymeric emulsions. It can be added to the emulsion simultaneously with incorporation of an anti-foaming agent, a pigment dispersant and a different surfactant. This viscosity conditioner may contain or may be mixed with various additives such as antioxidants, ultraviolet absorbers, water-proofing agents, antiseptic agents, bactericides, dispersants, antifoaming agents, deodorizer, fragrances, extenders, dyes, pigments and the like.

Other aqueous systems suitable for the viscosity conditioner of the present invention are paint compositions for use in the leather and textile industries, detergents, adhesives, waxes, polishing agents, cosmetics, toiletry goods, pharmaceuticals, agricultural chemicals and agricultural compositions.

In accordance with the present invention, a unique viscosity conditioner is provided, as specifically stated hereinbefore, which is by nature non-ionic and excellent in leveling.

EXAMPLES

With reference to the following production examples and working examples, the present invention will now be described in greater detail.

Production Example A

Into a 4-necked flask of 1,000 ml in volume equipped with a thermometer, a nitrogen inlet tube and a stirrer was charged 665 parts by weight of an adduct of nonylphenol with 35 mols of ethylene oxide (EO). Dehydrating was done in vacuo (below 10 mm Hg) at from 90 to 100° C. for 3 hours until the moisture in the reaction system was lowered to 0.03%. Upon cooling of the reaction system to 80° C., 31.8 parts by weight of hexamethylene diisocyanate (HMDI) was placed in the system. Reaction was then effected at 80 to 90° C. for 2 hours in a nitrogen stream at which time the isocyanate content was confirmed to be nil. Thus, a reaction product was obtained which was a pale yellowish solid at normal ambient temperatures. This product is hereunder called Compound A ($R^1$: hexamethylene group; $R^2$: nonylphenyl group; $R^3$: ethylene group; m=2; n=100).

Production Example B

The process of Production Example A was followed except that 685 parts by weight of an adduct of styrenated phenol with 100 mols of EO and 12.3 parts by weight were used. Thus, a pale yellowish solid product was obtained. This product is called Compound B ($R^1$: hexamethylene group; $R^2$: styrenated phenyl group; $R^3$: ethylene group; m=2; n=100).

The styrenated phenyl group is represented below.

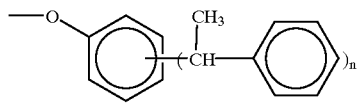

(n = 1 ~ 3)

Production Example C

The process of Production Example A was followed except that 673 parts by weight of an adduct of dodecyl alcohol with 50 mols of EO and 24.7 parts by weight of tolylene diisocyanate (TDI) were used. Thus, a pale yellowish solid product was obtained. This product is called Compound C ($R^1$: tolylene group; $R^2$: dodecyl group; $R^3$: ethylene group; m=2; n=50).

Production Example D

The process of Production Example A was followed except that 689 parts by weight of an adduct of octadecyl alcohol with 200 mols of EO and 5.3 parts by weight of tetramethylene diisocyanate (TMDI) were used. Thus, a pale yellowish solid product was obtained. This product is called Compound D ($R^1$: tetramethylene group; $R^2$: octadecyl group; $R^3$: ethylene group; m=2; n=200).

Production Example E

The process of Production Example A was followed except that 587 parts by weight of an adduct of nonylphenol with 100 mols of EO, 91.6 parts by weight of an adduct of styrenated phenol with 10 mols of EO and 22.1 parts by weight of TDI were used. Thus, a pale yellowish solid product was obtained. This product is called Compound E ($R^1$: tolylene group; $R^2$: nonylphenyl group, styrenated phenyl group; $R^3$: ethylene group; m=2; n=100, 10).

Production Example F

The process of Production Example A was followed except that 508 parts by weight of an adduct of nonylphenol with 50 mols of EO, 151 parts by weight of an adduct of styrenated phenol with 10 mols of EO and 35.3 parts by weight of HMDI were used. Thus, a pale yellowish solid product was obtained. This product is called Compound F ($R^1$: hexamethylene group; $R^2$: nonylphenyl group, styrenated phenyl group; $R^3$: ethylene group; m=2; n=100, 10).

Production Example G

The process of Production Example A was followed except that 553 parts by weight of an adduct of styrenated phenol with 100 mols of EO, 124 parts by weight of an adduct of dodecyl alcohol with 20 mols of EO and 20.5 parts by weight of HMDI were used. Thus, a pale yellowish solid product was obtained. This product is called Compound G ($R^1$: hexamethylene group; $R^2$: styrenated phenyl group, dodecyl group; $R^3$: ethylene group; m=2; n=100, 20).

Production Example H

The process of Production Example A was followed except that 702 parts by weight of an adduct of octylphenol with 200 mols of EO and 6.5 parts by weight of HMDI were used. Thus, a pale yellowish solid product was obtained. This product is called Compound H ($R^1$: hexamethylene group; $R^2$: octytphenyl group; $R^3$: ethylene group; m=2; n=100).

Production Example I

The process of Production Example A was followed except that 587 parts by weight of an adduct of nonylphenol with 100 mols of EO, 91.6 parts by weight of an adduct of styrenated phenol with 10 mols of propylene oxide and 17.8 parts by weight of TMDI were used. Thus, a pale yellowish solid product was obtained. This product is called Compound I ($R^1$: tetramethylene group; $R^2$: nonylphenyl group, styrenated phenyl group; $R^3$: ethylene group, propylene group; m=2; n=100, 10).

To add to the above compounds, two different viscosity conditioners of the following chemical components were tested for comparative purposes.

Comparative Product A

The process of Production Example A was followed except that 640 parts by weight of PEG (molecular weight: 4,000), 13.9 parts by weight of TDI, 16.9 parts by weight of dodecyl isocyanate and 23.6 parts by weight of octadecyl isocyanate were used. Thus, a pale yellowish solid product was obtained.

Comparative Product B

The process of Production Example A was followed except that 540 parts by weight of pentaerythritol and 140 parts by weight of phenylene isocyanate were used. Thus, a pale yellowish solid product was obtained.

Comparative Products A and B was uniformly mixed with 10 parts by weight of butyl cellosolve and 50 parts by weight of water, thereby providing a transparent liquid composition. The viscosities of all the test compositions are indicated below.

Compound A: 6,000 cPs
Compound B: 5,500 cPs
Compound C: 3,000 cPs
Compound D: 6,500 cPs
Compound E: 3,500 cPs
Compound F: 2,500 cPs
Compound G: 4,000 cPs
Compound H: 7,000 cPs
Compound I: 5,000 cPs
Comparative Product A: 10,000 cPs
Comparative Product B: 3,500 cPs Example 1

Evaluation with Emulsions

| Formulation | |
|---|---|
| emulsion *) | 100.0 g |
| viscosity condition (each of Compounds A to I and of Comparative Products A and B; 10% solid content; aqueous solution) | 0.5 g |
| anti-foaming agent (Adekanate B-940; mineral oil type; Asahi Denka Kogyo K.K.) | 0.2 g |

*) for gloss coating; commerically available; acrylate ester type; 500 cPs viscosity at 60 rpm The above formulation was hand-stirred for 5 minutes, followed by mechanical stirring (at 1,000 rpm). Viscosity measurement was made of the resulting compositions, Compounds A to I and Comparative Products A and B, after standing at 25° C. for 2 hours.

Measurement Method viscometer: BM viscometer rotor: No. 4 revolutions: 6 and 60 rpm

The test results thus obtained are shown in Table 1.

TABLE 1

| Viscosity Conditioner | Viscosity at | | Viscosity Ratio |
|---|---|---|---|
| | 60 rpm | 6 rpm | 6/60 rpm |
| Compound A | 4,400 | 11,500 | 2.6 |
| Compound B | 2,300 | 5,300 | 2.3 |
| Compound C | 3,400 | 7,400 | 2.2 |
| Compound D | 1,900 | 3,200 | 1.7 |
| Compound E | 4,700 | 7,000 | 1.5 |
| Compound F | 3,800 | 4,200 | 1.1 |
| Compound G | 3,300 | 6,000 | 1.8 |
| Compound H | 2,500 | 5,000 | 2.0 |
| Compound I | 2,300 | 3,000 | 1.3 |
| Comparative Product A | 500 | 750 | 1.5 |
| Comparative Product B | 600 | 1,000 | 1.7 |

The same testing as above was repeated with the exception of use of an elastic coating emulsion (commercially available; styrene acrylate ester type; 1,000 cPs viscosity at 60 rpm) and of an Adekanate B-190 anti foaming agent (Asahi Denka Kogyo K.K.).

The test results are shown in Table 2.

TABLE 2

| Viscosity Conditioner | Viscosity at | | Viscosity Ratio |
|---|---|---|---|
| | 60 rpm | 6 rpm | 6/60 rpm |
| Compound A | 19,100 | 38,200 | 2.0 |
| Compound B | 20,300 | 36,500 | 1.8 |
| Compound C | 26,300 | 31,600 | 1.2 |
| Compound D | 12,600 | 26,500 | 2.1 |
| Compound E | 20,800 | 35,300 | 1.7 |
| Compound F | 24,400 | 34,200 | 1.4 |
| Compound G | 22,200 | 42,100 | 1.9 |
| Compound H | 24,900 | 27,400 | 1.1 |
| Compound I | 16,400 | 49,200 | 3.0 |
| Comparative Product A | 1,400 | 3,800 | 2.7 |
| Comparative Product B | 1,300 | 4,000 | 3.1 |

Example 2

Evaluation with Paint

| Formulation | |
|---|---|
| water | 90 parts by weight |
| viscosity conditioner (each of Compounds A to I and of Comparative Products A and B) | 70 parts by weight |
| pigment dispersant (25% polycarboxylic acid type) | 10 parts by weight |
| anti-freezing agent (ethylene glycol) | 20 parts by weight |
| anti-foaming agent (Adekanate B-940; Asahi Denka Kogyo K.K.) | 2 parts by weight |
| titanium oxide | 140 parts by weight |
| calcium carbonate | 160 parts by weight |

The above formulation was stirred for 24 hours and eventually used as a mill base. Thereafter, this mill base as formulated below was stirred for 5 hours:

| Formulation | |
|---|---|
| mill base | 493 parts by weight |
| emulsion (styrene-acrylate ester type) | 410 parts by weight |
| anti-foaming agent (Adekanate B-190; Asahi Denka Kogyo K.K.) | 3 parts by weight |

After being allowed to stand at a given temperature (25° C.) for 2 hours, the finished paint was measured in regard to its viscosities.

Measurement Method viscometer: BM viscometer rotor: No. 4 revolutions: 2 and 20 rpm

The test results are shown in Table 3.

TABLE 3

| Viscosity Conditioner | Viscosity at | | Viscosity Ratio |
|---|---|---|---|
| | 20 rpm | 2 rpm | 2/20 rpm |
| Compound A | 48,100 | 173,000 | 3.6 |
| Compound B | 52,600 | 132,000 | 2.5 |
| Compound C | 43,300 | 90,900 | 2.1 |
| Compound D | 48,800 | 195,000 | 4.0 |
| Compound E | 33,000 | 109,000 | 3.3 |
| Compound F | 45,800 | 77,900 | 1.7 |
| Compound G | 45,900 | 133,000 | 2.9 |
| Compound H | 52,100 | 151,000 | 2.9 |
| Compound I | 34,600 | 121,000 | 3.5 |
| Comparative Product A | 15,000 | 49,500 | 3.3 |
| Comparative Product B | 13,500 | 47,300 | 3.5 |

Example 3

Color Toning and Water Resistance with Emulsion

| Formulation | |
|---|---|
| emulsion (acrylate ester type) | 40.0 g |
| black pigment | 0.8 g |
| anti-foaming agent (Adekanate B-940; Asahi Denka Kogyo K.K.) | 0.1 g |

The above formulation was hand-mixed for 1 minute, followed by homogenization through mechanical stirring with a large turbine impeller for 10 to 20 minutes at revolutions of 1,000 to 2,000 rpm. The resultant emulsion was coated over a slate plate.

Color toning was adjudged in respect of any appreciable color changes at three points of the emulsion product, i.e., (1) wet-on-wet coating, (2) coated surface texture upon finger rubbing and (3) coat sagging, as compared to the coated surface obtained with a single coating.

Water resistance was determined by inspecting the state of the coat after immersion in warm water of 50° C. for 24 hours.

The test results are shown in Table 4.

In this table, the symbol "o" is taken as "not different", "+" as "slightly different" and "x" as "largely different".

TABLE 4

| Viscosity Conditioner | Color Tone | | | water Resistance |
|---|---|---|---|---|
| | point 1 | point 2 | point 3 | |
| Compound A | o | o | o | not different |
| Compound B | o | o | o | not different |
| Compound C | o | o | o | not different |
| Compound D | o | o | o | not different |
| Compound E | o | o | o | not different |
| Compound F | o | o | o | not different |
| Compound G | o | o | o | not different |
| Compound H | o | o | o | not different |
| Compound I | o | o | o | not different |
| Comparative Product A | x | + | x | slightly blistered |
| Comparative Product B | o | x | x | greatly blistered |

Example 4

Color Toning and Water Resistance with Paint

| Formulation | |
|---|---|
| paint used in Example 2 | 40.0 g |
| black pigment | 0.8 g |
| anti-foaming agent (Adekanate B-940; Asahi Denka Kogyo K.K.) | 0.1 g |

The above formulation was hand-mixed for 1 minute, followed by homogenization through mechanical stirring with a large turbine impeller for 10 to 20 minutes at revolutions of 1,000 to 2,000 rpm. The finished emulsion was coated over a slate plate.

Color toning was adjudged in respect of any appreciable color changes at three points of the emulsion paint, i.e., (1) wet-on-wet coating, (2) coated surface texture upon finger rubbing and (3) coat sagging, as compared to the coated surface obtained with the single coating.

Water resistance was determined by inspecting the state of the coat after immersion in warm water of 50° C. for 24 hours.

The test results are shown in Table 5 in which the symbol "o" is taken as "not different", "+" as "slightly different" and "x" as "largely different".

TABLE 5

| Viscosity Conditioner | Color Tone | | | water Resistance |
|---|---|---|---|---|
| | point 1 | point 2 | point 3 | |
| Compound A | o | o | o | not different |
| Compound B | o | o | o | not different |
| Compound C | o | o | o | not different |
| Compound D | o | o | o | not different |
| Compound E | o | o | o | not different |
| Compound F | o | o | o | not different |
| Compound G | o | o | o | not different |
| Compound H | o | o | o | not different |
| Compound I | o | o | o | not different |
| Comparative Product A | + | x | x | slightly blistered |
| Comparative Product B | + | x | + | greatly blistered |

What is claimed is:

1. A viscosity conditioner comprising a compound following formula:

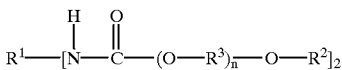

where $R^1$ is a residue remaining after isocyanate groups have been removed from a diisocyanate compound represented by $R^1-(NCO)_2$, $R^2$ is a hydrocarbyl group having 8 to 36 carbon atoms, with the proviso that at least one $R^2$ is an aralkyl group or an aralkyl aryl group, $R^3$ is an alkylene group of 2 to 4 carbon atoms, and n ranges from 1 to 1,000.

2. The viscosity conditioner according to claim 1, wherein the diisocyanate compound is one member selected from the group consisting of aliphatic diisocyanates, aromatic diisocyanates, alicyclic diisocyanates, biphenyl diisocyanates and phenylmethane diisocyanates.

3. The viscosity conditioner according to claim 1, wherein each $R^2$ in the formula is an aralkyl group and/or an aralkyl aryl group.

4. The viscosity conditioner according to claim 1, wherein the compound of the formula is derived from reaction of at least one diisocyanate compound of $R^1-(NCO)_2$ with at least one polyether monool compound of $R^2-O-(R^3-O)_n-H$.

5. An emulsion composition comprising the viscosity conditioner of any one of claims 1, 2, 3, or 4.

6. An emulsion paint composition comprising the viscosity conditioner of any one of claims 1, 2, 3, or 4.

* * * * *